US005183078A

United States Patent [19]

Sorrell

[11] Patent Number: 5,183,078

[45] Date of Patent: Feb. 2, 1993

[54] COMBINATION SHUT-OFF AND TEST-INJECTION VALVE

[76] Inventor: Harold E. Sorrell, 11311 Scottsdale, Stafford, Tex. 77477

[21] Appl. No.: 719,992

[22] Filed: Jun. 24, 1991

[51] Int. Cl.[5] .............. F16K 31/50

[52] U.S. Cl. .............. 137/883; 137/881; 73/756; 73/40.5 R

[58] Field of Search .............. 137/861, 864, 883, 862, 137/866, 872, 886, 606, 877, 878, 879, 880, 881; 73/866.5, 756, 40.5 R, 46, 37, 4 R; 251/215; 285/341

[56] References Cited

U.S. PATENT DOCUMENTS

| | | | |
|---|---|---|---|
| 3,467,357 | 9/1969 | Schomer et al. | 251/215 X |
| 3,747,894 | 7/1973 | Pepper | 251/215 |
| 4,120,319 | 10/1978 | Krechel et al. | 137/583 |
| 4,586,731 | 5/1986 | Castrup | 285/341 X |
| 4,711,268 | 12/1987 | Coleman | 73/756 X |
| 4,901,761 | 2/1990 | Taylor | 73/40.5 R X |
| 5,048,329 | 9/1991 | Marchini | 73/37 X |

*Primary Examiner*—Martin P. Schwadron
*Assistant Examiner*—Kevin L. Lee
*Attorney, Agent, or Firm*—Kenneth A. Roddy

[57] ABSTRACT

A combination shut-off and test-injection valve has a valve body with an inlet end and an outlet end adapted for connection to a fluid line or conduit and a fluid flow passageway extending from end to end. A shut-off valve in the body is movable between an open position allowing fluid flow through the body and a closed position closing off fluid flow through the body. The combination valve has a test-injection valve in fluid communication with the fluid flow passageway adjacent the shut-off valve which is movable between a normally closed position preventing communication between the fluid flow passageway and the exterior of the body and an open position allowing fluid communication between the fluid flow passageway and the exterior of the body. The shut-off valve and the test-injection valve operate independently whereby the shut-off valve may be operated to open or close fluid flow through the valve body and isolate portions of the fluid system in which it is installed and the test-injection valve may be connected to test equipment, injection devices, and the like for diagnosing and cleaning the fluid system and its components during normal operating conditions or in an isolated condition. The combination valve may be left in the system after installation and will not interfere with normal operations as long as the shut-off valve remains open and will allow subsequent diagnosing and testing of the system and its components.

11 Claims, 2 Drawing Sheets

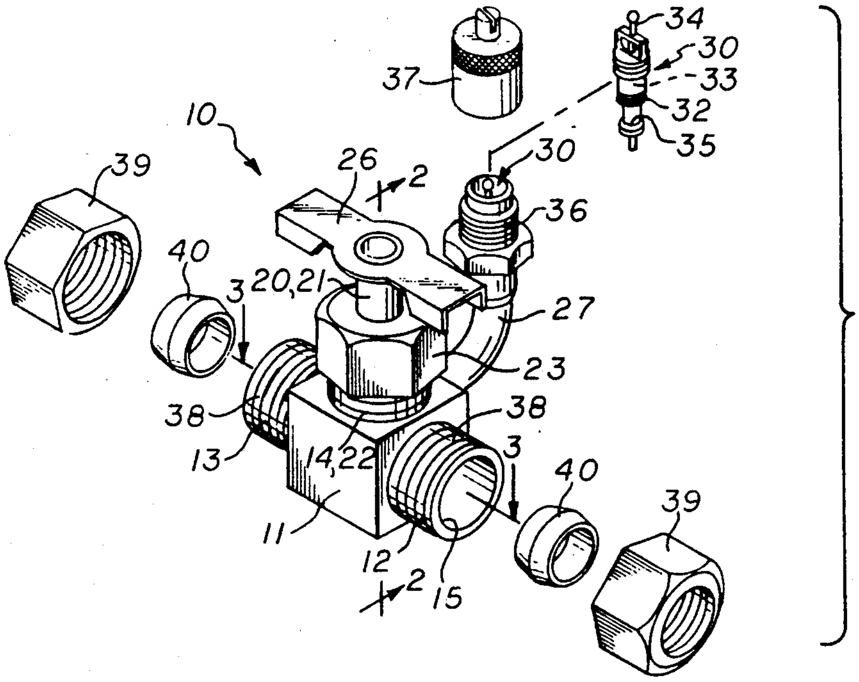
FIG. 1
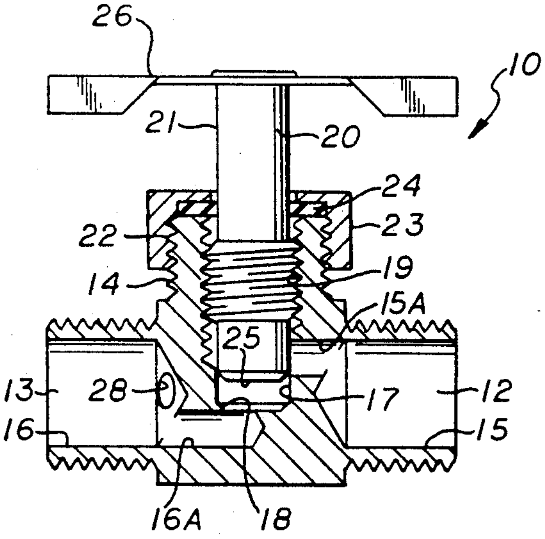
FIG. 2
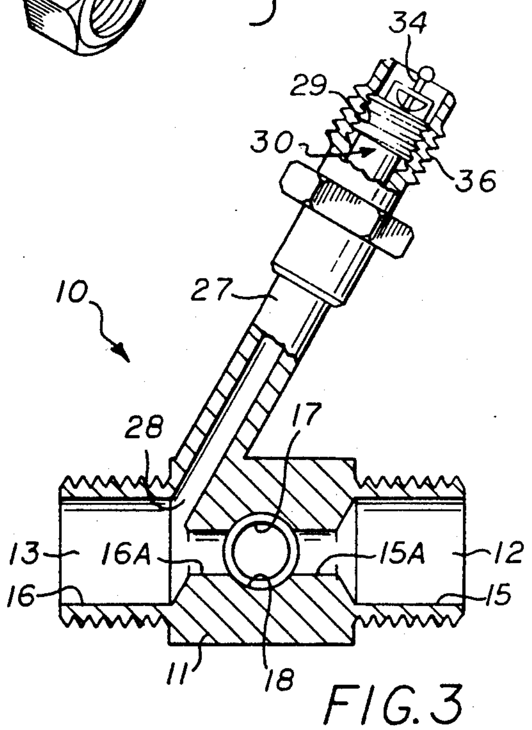
FIG. 3
FIG. 4
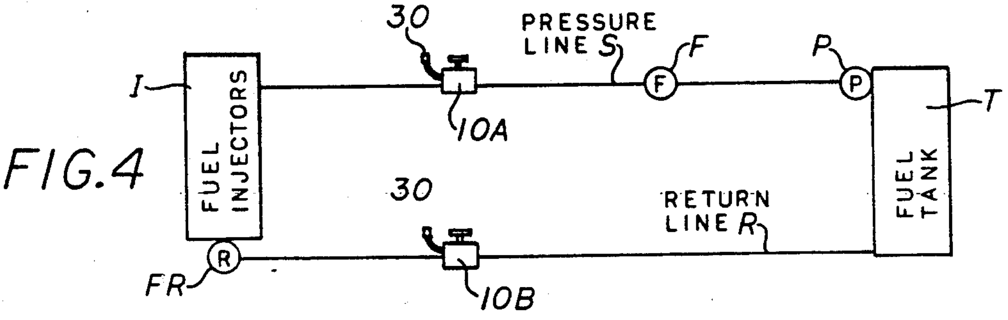

COMBINATION SHUT-OFF AND TEST-INJECTION VALVE

BACKGROUND OF THE INVENTION

1. Field of the Invention

This invention relates generally to valves, and more particularly to a combination shut-off and test-injection valve having a shut-off valve portion for shutting off fluid flow through the valve body to isolate portions of the system in which it is installed and a test-injection portion which allows connection of test equipment, gauges, and injection devices for diagnosing and cleaning the system and its components.

2. Brief Description of the Prior Art

In diagnosing fuel and air systems of engines, it is often necessary isolate portions of the system and then to install various testing equipment, gauges, and injection devices to test and clean the fuel or air system and its components.

In order to carry out the diagnosing and servicing operations, the service technician must have on hand a large inventory of various adapters and fittings, particularly when servicing systems which are not provided with test ports. When connected, the adapters and fitting are prone to leakage which results in inaccurate readings, and safety hazards.

Maintaining an inventory of adapters and fittings necessary to access the various different systems of all the vehicles on the road today is a considerable financial expense. Many late model automobiles have fuel pumps and fuel pressure regulators which cannot be easily disabled. Locating the proper test points in the system and connecting the appropriate combination of adapters and fittings is also time consuming, thus labor and cost intensive. For these reasons, many mechanics and automotive shops will not provide this type of service.

It would therefore be desirable to provide a combination shut-off and test-injection valve which can be easily connected in nearly all fuel or air lines and will allow components and portions of fuel or air systems to be isolated and which has an integral test-injection fitting to allow connection of test equipment, gauges, and injection devices for diagnosing and cleaning the system and its components.

There are several patents which disclose various combination valves.

Krechel et al, U.S. Pat. No. 4,076,211 discloses a combination valve and manifold assembly for a compressed air storage tank or the like having a spherical ball valve rotatably disposed within a lateral bore of the valve body with circular sealing heads at each side of the ball portion to balance the pressure forces acting on the ball member which tend to move it axially. A seal body is received in the main flow passageway in one end of the valve body to sealingly engage the ball member after it has been installed in the lateral bore. The valve body has two outlet nipples at the inlet end for connection to a pressure gauge or pressure actuated switch for controlling operation of an air compressor. Each nipple has a tubular metal stiffener pressed therein. A safety pressure relief valve is provided in the manifold assembly for automatically relieving pressure from within the compressor tank upon exceeding a predetermined pressure level.

Heinen, U.S. Pat. No. 3,362,433 discloses a four-way plug valve which has a bleed valve connected to the valve bonnet in communication with the outer side of the plug member and a pressure relief valve connected to a bottom plate beneath the plug member.

The present invention is distinguished over the prior art in general, and these patents in particular by a combination shut-off and test-injection valve which has a shut-off valve and a test-injection valve in the valve body. The valve body has an inlet end and an outlet end adapted for connection to a fluid line or conduit and a fluid flow passageway extending from end to end. The shut-off valve in the body is movable between an open position allowing fluid flow through the body and a closed position closing off fluid flow through the body. The test-injection valve is in fluid communication with the fluid flow passageway adjacent the shut-off valve which is movable between a normally closed position preventing communication between the fluid flow passageway and the exterior of the body and an open position allowing fluid communication between the fluid flow passageway and the exterior of the body. The shut-off valve and the test-injection valve operate independently whereby the shut-off valve may be operated to open or close fluid flow through the valve body and isolate portions of the fluid system in which it is installed and the test-injection valve may be connected to test equipment, injection devices, and the like for diagnosing and cleaning the fluid system and its components during normal operating conditions or in an isolated condition. The combination valve may be left in the system after installation and will not interfere with normal operations as long as the shut-off valve remains open and will allow subsequent diagnosing and testing of the system and its components.

SUMMARY OF THE INVENTION

It is therefore an object of the present invention to provide a combination shut-off and test-injection valve having a shut-off valve portion and a test-injection portion which can be quickly and easily installed in fuel lines, air lines, and the like for diagnosing and cleaning the fuel or air system and its components.

It another object of this invention to provide a combination shut-off and test-injection valve having a shut-off valve portion for shutting off fluid flow through the valve body to isolate portions of the system in which it is installed and a test-injection portion which allows connection of test equipment, gauges, and injection devices for diagnosing and cleaning the system and its components.

Another object of this invention is to provide a combination shut-off and test-injection valve having a shut-off valve portion and a test-injection portion which once installed in a fuel or air system may be left in place such that later subsequent diagnosing and testing of the system and its components may be quickly and easily accomplished.

Another object of this invention is to provide a combination shut-off and test-injection valve having a shut-off valve portion and a test-injection portion which once installed allows diagnosing and testing of fuel and air systems during their normal operation.

A further object of this invention is to provide a combination shut-off and test-injection valve having a shut-off valve portion and a test-injection portion which is particularly useful in diagnosing and testing fuel injector systems during normal operating conditions.

A still further object of this invention is to provide a combination shut-off and test-injection valve which is simple in construction, economical to manufacture, and rugged and reliable in operation.

Other objects of the invention will become apparent from time to time throughout the specification and claims as hereinafter related.

The above noted objects and other objects of the invention are accomplished by a combination shut-off and test-injection valve which has a shut-off valve and a test-injection valve in the valve body. The valve body has an inlet end and an outlet end adapted for connection to a fluid line or conduit and a fluid flow passageway extending from end to end. The shut-off valve in the body is movable between an open position allowing fluid flow through the body and a closed position closing off fluid flow through the body. The test-injection valve is in fluid communication with the fluid flow passageway adjacent the shut-off valve which is movable between a normally closed position preventing communication between the fluid flow passageway and the exterior of the body and an open position allowing fluid communication between the fluid flow passageway and the exterior of the body. The shut-off valve and the test-injection valve operate independently whereby the shut-off valve may be operated to open or close fluid flow through the valve body and isolate portions of the fluid system in which it is installed and the test-injection valve may be connected to test equipment, injection devices, and the like for diagnosing and cleaning the fluid system and its components during normal operating conditions or in an isolated condition. The combination valve may be left in the system after installation and will not interfere with normal operations as long as the shut-off valve remains open and will allow subsequent diagnosing and testing of the system and its components.

BRIEF DESCRIPTION OF THE DRAWINGS

FIG. 1 is an exploded isometric view of the a preferred combination shut-off and test-injection valve in accordance with the present invention.

FIG. 2 is a cross section of the shut-off valve portion of the combination valve taken along line 2—2 of FIG. 1.

FIG. 3 is a cross section of the test-injection portion of the combination valve taken along line 3—3 of FIG. 1.

FIG. 4 is a schematic diagram showing a pair of the combination valves installed in a fuel injection system.

DESCRIPTION OF THE PREFERRED EMBODIMENT

Figure 5:
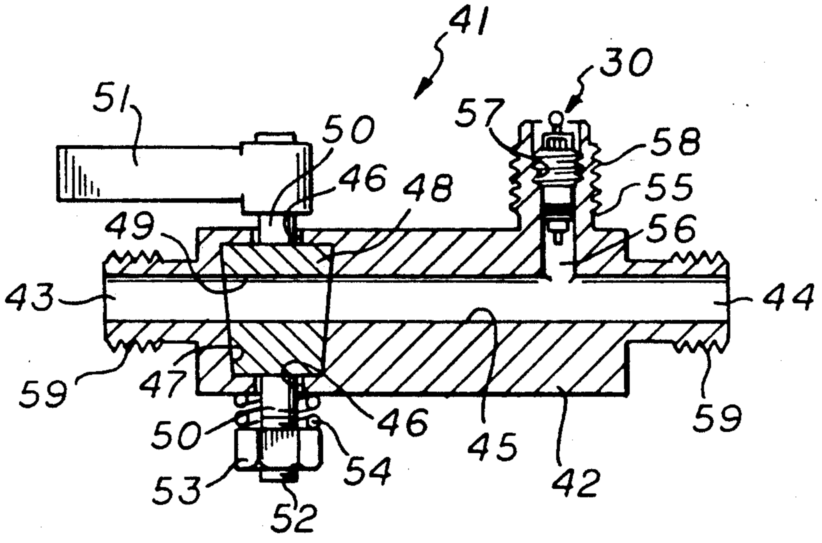
FIG. 5 is a cross section of an alternate combination valve having the shut-off valve and test-injection portions in the same plane.

Referring to the drawings by numerals of reference, there is shown in FIGS. 1, 2, and 3, a preferred embodiment of a combination shut-off and test-injection valve 10. The combination valve 10 has a generally T-shaped valve body 11 with axially aligned inlet end 12, outlet end 13, and a bonnet end 14 perpendicular to the ends 12 and 13. A longitudinal bore 15 and 16 extends a distance inwardly from each opposed end 12 and 13. A pair of smaller diameter axially offset passageways 15A and 16A extend inwardly from each bore 15 and 16, respectively. The passageways 15A and 16A are in fluid communication with a central bore which extends inwardly from the bonnet end 14 perpendicular to the longitudinal bores 15 and 16 and defines a valve chamber 17. A valve seat 18 is formed between the passageways 15A and 16A near the bottom end of the valve chamber 17.

The upper portion of the valve chamber 17 above the valve seat 18 is internally threaded 19, and an externally threaded valve stem 20 is threadedly received in the valve chamber 17 to move axially therein upon rotation and has an outwardly extending portion 21. The exterior of the bonnet end 14 is externally threaded 22. A bonnet nut 23 is threadedly secured on the external threads 22 of the bonnet end 14 and surrounds the outer end 21 of the valve stem 20. An elastomeric seal element 24 is captured between the outer face of the bonnet end 14 and the inner surface of the nut 23 to form a fluid seal at the outer end of the valve chamber 17 between the exterior of the valve stem 20 and the threaded connection of the bonnet nut 23. The bottom end 25 of the valve stem 20 is chamfered to form a fluid sealing relation with the valve seat 18 of the body. The valve stem 20 is rotated by a handle 26 secured at its outer end 21.

A small diameter tubular extension 27 extends outwardly from the valve body 11. The interior passageway of the extension 27 is in fluid communication with one of the bores 15 or 16, at a location laterally spaced from the valve seat 18 to provide a test-injection port 28. The passageway at the outer end of the extension 27 is internally threaded 29 and receives a test-injection valve 30, such as a Schrader-type valve. The test-injection valve 30 is of conventional construction having an exterior seal 32 and an internal spring 33 which urges a plunger 34 upwardly into engagement on a valve seat 35 at the bottom of the valve body. The top of the plunger 34 extends above the top of the test-injection valve body and, when depressed, unseats the plunger. The exterior of the outer end of the extension 27 is externally threaded 36 to receive a Schrader-type valve removal cap 37 and other conventional test and injection threaded fittings as described hereinafter. The cap 37 may be used to install and remove the valve 30 and protects the valve from debris when not in use. The test-injection valve 30 allows selective communication between the longitudinal fluid flow passageways and the exterior of the valve body.

The inlet end 12 and outlet end 13 have external threads 38 and are configured to be connected to a conduit. In the illustrated embodiment, the ends 12 and 13 are configured to be connected to a small diameter tubing line, such as a fuel line or air line, by a conventional tubing compression fitting connection. A compression nut 39 and pinch sleeve 40 are provided for each end to accomplish the connection.

It should be understood that the ends of the valve body may be flanged or otherwise adapted for connection to various fluid lines.

When installing the valve body 11 in a tubing line, the tubing line is cut, and a compression nut 39 is slid onto the opposite facing ends of the tubing followed by a pinch sleeve 40, the ends of the tubing are inserted into the ends 12 and 13 of the valve body, and then each nut is threadedly tightened onto the valve body ends.

The valve stem 20 forms a shut-off valve member. When turned in one direction, the valve stem 20 is raised off the valve seat 18 to allow fluid flow through the body via bores 15 and 16 and passageways 15A and 16A. When turned in the opposite direction, the valve stem 20 is lowered to engage the valve seat 18 and form a sealing relation therewith to shut off fluid flow through the body. The test-injection port 28 is in constant fluid communication with the fluid flow passageways at one side of the valve seat 18. Unless unseated, the test-injection valve 30 remains normally closed regardless of whether the shut-off valve is opened or closed. Thus, fluid communication between the longitudinal fluid flow passageways and the exterior of the valve body is normally closed unless the stem of the test-injection valve is depressed.

The combination valve 10 may be installed in fuel lines, and air lines, and may be installed in a supply line or return line, or a combination valve may be installed in each line, depending upon the particular application. The outer end of the extension 27 (and test-injection valve plunger 34) may be connected to various test equipment, gauges, and injection devices.

The combination valve 10 is particularly useful in diagnosing and servicing fuel injection systems. As seen in FIG. 4, a first combination valve 10A is installed in the fuel supply pressure line S between the fuel filter F/fuel pump P and the fuel injectors I, and a second combination valve 10B is installed in the return line R between the fuel pressure regulator FR and the fuel tank T. A test gauge (not shown) may be connected to the Schrader-type valve fittings (30) of combination valve 10A or 10B to determine the pressure increase or decrease on the supply side of the injectors, or in the return line downstream of the injectors I and fuel pressure regulator FR. If both shut-off valves are open, testing may be carried out during actual operation of the system.

The shut-off valve allows either line to be completely closed off whereby the injectors I and/or fuel pump P may be isolated. High pressure air may be forced through the isolated portion of the system between one test-injection valve connection and read by a gauge connected to the other test-injection valve to determine pressure, vacuum, or leakage, in the isolated section. High pressure air or cleaning fluid may be forced through the isolated portion of the system between one test-injection valve connection and bled off at the other test-injection valve connection to clean the system, or isolated portion of the system.

An alternate embodiment of the combination shut-off and test-injection valve 41 is shown in FIG. 5, wherein a plug type shut-off valve is used and the test-injection valve 30 is housed in the main body of the valve rather than at the end of an extended portion of the body. The combination valve 41 has a unitary rectangular body 42 with an inlet end 43 and an outlet end 44, and a longitudinal bore 45 extends from end to end. Bores 46 extend through opposite side walls of the body 42 in axial alignment with a larger conical valve chamber 47 formed in the body perpendicular to the longitudinal bore 45.

A conical valve plug 48 is rotatably installed in the valve chamber 47 and has a transverse bore 49 therethrough which may be turned to be in axial alignment with the longitudinal bore 45 allowing fluid flow through the body, or may be turned perpendicular thereto to shut off fluid flow through the body. A stem portion 50 extends axially from each end of the plug 48 through the bores 46 in the valve body 42. A handle 51 is secured to one end of the stem portion 50 and the other end of the stem portion is externally threaded 52 and receives a nut 53. A compression spring 54 is installed between the side wall of the body 42 and the nut 53 to wedge the plug 48 into rotary sealing relation with the tapered surface of the valve chamber 47.

An extension 55 of the valve body 42 laterally spaced from the valve chamber 47 extends outwardly a short distance from the valve body. The interior of the extension 55 has a bore in fluid communication with the longitudinal bore 45, to provide a test-injection port 56. The interior of the extension 55 is internally threaded 57 and receives a test-injection valve 30 (described previously). The exterior of the extension 54 has external threads 58 to receive a Schrader-type valve removal cap and other conventional test and injection threaded fittings as described previously.

As with the previously described embodiment, the inlet end 43 and outlet end 44 have external threads 59 and are configured to be connected to a conduit and may be configured to be connected to a small diameter tubing line, such as a fuel supply line, by a conventional tubing compression fitting connection. A conventional compression nut and pinch sleeve (not shown) may also be provided for each end to accomplish the connection. It should be understood that the ends of the valve body may be flanged or otherwise adapted for connection to various fluid lines.

OPERATION

The operation of the combination valve should be obvious from the foregoing description, but portions of the above description will be repeated in part for clarity.

To initially install the combination valve in a tubing line, the line should be bled, if a pressurized system. The tubing line is cut, and a compression nut is slid onto the opposite facing ends of the cut tubing followed by a pinch sleeve. The ends of the tubing are inserted into the ends of the valve body, and the nuts are threaded onto the valve body ends. The end of the valve having the test-injection valve 30 should always be positioned toward the engine. Once installed, the combination valve may be left in place and will not interfere with the normal operation of the system in which it is installed as long as the shut-off valve remains open.

Depending upon the particular application, the combination valve may be installed in fuel lines, air lines, and the like, and may be installed in a supply line or return line, or a combination valve may be installed in each line. The test-injection valve may be connected to various types of test equipment, gauges, and injection devices.

Referring again to FIG. 4, as an example, the combination valve 10 is particularly useful in diagnosing and servicing fuel injection systems. A first combination valve 10A is installed in the fuel supply pressure line S between the fuel filter F/fuel pump P and the fuel injectors I, and a second combination valve 10B is installed in the return line R between the fuel pressure regulator FR and the fuel tank T. A pressure gauge (not shown) is connected to the test-injection valve fitting 30 of combination valve 10A to determine the pressure increase or decrease on the supply side of the injectors.

With a pressure gauge connected to the combination valve 10A, the shut-off valve of both combination valves 10A and 10B are opened and the engine is started and allowed to run. While the engine is running, a pressure reading is taken of the fuel pump pressure. With the engine still running, the shut-off valve of combination valve 10B is closed off, and another pressure reading is taken to determine the maximum fuel pump pressure. The shut-off valve of combination valve 10B is opened after the maximum pressure reading is taken.

After noting the pressure readings, the engine is turned off, and another pressure reading is taken to determine the residual fuel pressure. If the fuel pressure drops, the engine is re-started and turned off. The shut-off valve of combination valve 10A is then closed off and another pressure reading is taken. If the fuel pressure holds, this indicates that the fuel pump check valve or check ball is defective and the fuel pump should be replaced. If the fuel pressure drops, the shut-off valve of combination 10A is opened and the shut-off valve of combination valve 10B is closed, and the engine is re-started and turned off. Another pressure reading is taken and if the pressure holds, this indicates that the fuel pressure regulator is defective and must be replaced. If the pressure still drops, this indicates that the fuel injectors are leaking and must be cleaned or replaced.

To clean the injectors I, the shut-off valve of both combination valves 10A and 10B are closed off to isolate the fuel injectors and fuel pressure regulator FR. High pressure air or cleaning fluid may be forced through the isolated portion of the system between one test-injection valve connection and bled off at the other test-injection valve to clean the system, or isolated portion of the system.

Once installed, the combination valve may be left in the line or lines whereby later subsequent diagnosing and testing of the system and its components may be quickly and easily carried out. The combination valve will not interfere with the normal operation of the system in which it is installed as long as the shut-off valve remains open.

If diagnosing a system already having the combination valve installed, the service technician merely connects the appropriate gauges and closes the appropriate shut-off valve to isolate the suspected trouble area and test the system as described above.

If it is desired to remove the combination valves, the compression nuts are loosened and the combination valves are replaced with a conventional compression union.

While this invention has been described fully and completely with special emphasis upon a preferred embodiment, it should be understood that within the scope of the appended claims the invention may be practiced otherwise than as specifically described herein.

I claim:

1. A combination shut-off and test-injection valve comprising;

a valve body having an axially aligned inlet end and outlet end adapted for connection to a fluid line or conduit, a main fluid flow passageway extending from end to end, a shut-off valve chamber in fluid communication with said main fluid flow passageway, and an outwardly extending tubular extension adapted at its outer end for connection to diagnostic and injection devices and having an interior fluid passageway in fluid communication with said main fluid flow passageway at a location laterally spaced from said shut-off valve chamber to define a test-injection valve passageway, shut-off valve means having a portion movably disposed in said shut-off valve chamber movable between an open position allowing fluid flow through said through said main fluid flow passageway from either end and a closed position closing off fluid flow through said main fluid flow passageway and having a stem portion extending outwardly through a side wall of said valve body, means on the outer end of said stem portion for moving said shut-off valve means between the open and closed positions, seal means between said stem portion and said valve body for preventing fluid leakage from said main fluid flow passageway around said stem portion to the exterior of said valve body, test-injection valve means mounted in said test-injection valve passageway at the outer end of said tubular extension and having a spring biased plunger mechanism movable between a normally closed position preventing communication between said main fluid flow passageway and the exterior of said body and an open position allowing fluid communication between said main fluid flow passageway and the exterior of said body, and said shut-off valve means and said test-injection valve means being independently operable whereby said shut-off valve means may be operated to open or close fluid flow through said valve body and isolate portions of the fluid system in which it is installed and said test-injection valve means may be connected to various test equipment and injection devices for diagnosing and cleaning the fluid system and its components during normal operating conditions of the fluid system or in an isolated condition.

2. A combination shut-off and test-injection valve according to claim 1 in which said valve body is a generally rectangular member having a bore extending inwardly from the exterior of one side wall of said rectangular member in fluid communication with said main fluid flow passageway and perpendicular thereto and said bore defining said shut-off valve chamber, said shut-off valve means comprises a valve member having a portion rotatably disposed in said valve chamber and rotatable between an open position allowing fluid flow through said main fluid flow passageway and a closed position closing off fluid flow through said main fluid flow passageway and said valve member having a stem portion extending outwardly through the side wall of said rectangular member, handle means on the outwardly extended end of said stem portion for manually rotating said valve member, and rotary seal means between said stem portion and said valve body for preventing fluid leakage from said main fluid flow passageway around said stem portion to the exterior of said valve body.

3. A combination shut-off and test-injection valve according to claim 2 in which said valve body shut-off valve chamber is generally cylindrical, and said shut-off valve member portion disposed in said valve chamber is generally cylindrical.

4. A combination shut-off and test-injection valve according to claim 3 in which said shut-off valve chamber is threaded at its outer end and has a valve seat at its inner end, and said shut-off valve member stem portion is threadedly and rotatably engaged in said shut-off valve chamber, such that when said stem portion is rotated to the open position said valve member portion disposed in said valve chamber will be raised off said valve seat allowing fluid flow through said main fluid flow passageway and when turned to the closed position said valve member portion disposed in said valve chamber will be lowered to engage said valve seat to close off fluid flow through said main fluid flow passageway.

5. A combination shut-off and test-injection valve according to claim 2 in which said shut-off valve member portion disposed in said valve chamber has a bore therethrough transverse to the longitudinal axis of said stem portion, whereby when said stem portion is rotated to the open position said transverse bore will be in axial alignment with said main fluid flow passageway allowing fluid flow therethrough and when turned to the closed position said transverse bore will be aligned perpendicular to said main fluid flow passageway to close off fluid flow therethrough.

6. A combination shut-off and test-injection valve according to claim 5 in which said shut-off valve chamber is a frusto-conical configuration, said shut-off valve member portion disposed in said valve chamber is a frusto-conical configuration having a second opposed stem portion in axial alignment with the first said stem portion and extending outwardly through the opposite side wall of said rectangular member and the outer end thereof being threaded, a nut threadedly received on said threaded outer end of said opposed stem portion, and spring means on said opposed stem portion having one end engaged on said opposite side wall and its other end engaged on said nut to urge the tapered surfaces of said frusto-conical members into rotary sealing relation.

7. A combination shut-off and test-injection valve according to claim 1 in which said test-injection valve means comprises a small externally threaded tubular valve body threadedly received in said test-injection passageway and having a valve seat at its inwardly disposed end, an external seal on said externally threaded tubular valve body for preventing fluid leakage through the threaded connection, a plunger slidably mounted in said externally threaded tubular valve body having a bottom end configured to sealingly engage said valve seat and a top end extending above the top end of said tubular valve body, and a spring mounted in the interior of said tubular valve body and operatively connected to said plunger to normally urge said plunger bottom end into sealing engagement on said tubular valve body valve seat, said plunger when depressed causing said plunger bottom end to unseat from said tubular valve body valve seat and allowing fluid communication through said tubular valve body between said main fluid flow passageway and the exterior of said valve body.

8. A combination shut-off and test-injection valve according to claim 7 including external threads on the outer end of said tubular extension, and an internally threaded cap member removably received on the threaded outer end of said tubular extension and having an outwardly extending valve removal projection for installing and removing said externally threaded tubular valve body.

9. A combination shut-off and test-injection valve according to claim 1 in which said valve body is a generally rectangular member having an externally threaded inlet end and outlet end, and said inlet and outlet ends are configured to receive a compression nut and a compression pinch collar for sealable connection to tubular fluid lines or conduit.

10. A combination shut-off and test-injection valve comprising;

a generally rectangular valve body having an externally threaded inlet end and outlet end configured to receive a compression nut and compression pinch sleeve for sealable connection to tubular fluid lines or conduit, a main fluid flow passageway extending from end to end, a valve chamber in fluid communication with said main fluid flow passageway and perpendicular thereto, and an outwardly extending tubular extension adapted at its outer end for connection to diagnostic and injection devices and having an interior fluid passageway in fluid communication with said body main fluid flow passageway at a location laterally spaced from said valve chamber to provide a test-injection passageway, shut-off valve means in said valve chamber movable between an open position allowing fluid flow through said main fluid flow passageway from either end and a closed position closing off fluid flow through said main fluid flow passageway, test-injection valve means in said tubular extension in fluid communication with said body main fluid flow passageway adjacent said shut-off valve means and having a spring biased plunger mechanism movable between a normally closed position preventing communication between said main fluid flow passageway and the exterior of said valve body and an open position allowing fluid communication between said main fluid flow passageway and the exterior of said body, said shut-off valve means and said test-injection valve means being independently operable whereby said shut-off valve means may be operated to open or close fluid flow through said main fluid flow passageway and said test-injection valve means may be connected to test equipment and injection devices for diagnosing and cleaning the fluid system and components in the fluid line or conduit in which said valve body is connected.

11. A combination shut-off and test-injection valve comprising;

a valve body having an axially aligned inlet end and outlet end adapted for connection to a fluid line or conduit, a main fluid flow passageway extending from end to end, and a shut-off valve chamber in said body and in fluid communication with said main fluid flow passageway, shut-off valve means in said body shut-off valve chamber movable between an open position allowing fluid flow through said body from either end and a closed position closing off fluid flow through said body, an outwardly extending tubular extension on said valve body adapted at its outer end for connection to diagnostic and injection devices and having an interior fluid passageway in fluid communication with said body main fluid flow passageway at a location laterally spaced from said shut-off valve chamber, test-injection valve means mounted in said test-injection passageway at the outer end of said tubular extension and having a spring biased plunger mechanism movable between a normally closed position preventing communication between said main fluid flow passageway and the exterior of said body and an open position allowing fluid communication between said main fluid flow passageway and the exterior of said body, said shut-off valve means and said test-injection valve means being independently operable whereby said shut-off valve means may be operated to open or close fluid flow through said valve body and isolate portions of the fluid system in which it is installed and said test-injection valve means may be connected to various test equipment and injection devices for diagnosing and cleaning the fluid system and its components during normal operating conditions of the fluid system or in an isolated condition.

* * * * *